Aug. 2, 1932.  F. STRATTNER ET AL  1,869,588
CONSTANT SPEED TESTING DEVICE FOR WATTHOUR METERS
Filed July 16, 1929

WITNESS:

INVENTOR
Frederick Strattner
Walter C. Wagner
BY Augustus B. Stoughton
ATTORNEY.

Patented Aug. 2, 1932

1,869,588

UNITED STATES PATENT OFFICE

FREDERICK STRATTNER, OF PHILADELPHIA, AND WALTER C. WAGNER, OF ARDMORE, PENNSYLVANIA

CONSTANT SPEED TESTING DEVICE FOR WATTHOUR METERS

Application filed July 16, 1929. Serial No. 378,617.

The principal object of the present invention is to provide a device for discovering error, if any, in a watthour meter and for measuring the error if discovered; in other words, for ascertaining whether or not a watthour meter is in calibration, and further if the watthour meter is out of calibration for measuring the error. Another object of the invention is to provide for rapidly and accurately making the test above referred to. Another object of the invention is to provide a device of the type specified which may, if desired, be assembled in portable form. Another object of the invention is to provide a device of the type set forth which shall give visible indications. Another object of the invention is to provide such a device which can be readily operated by one person. Another object of the invention is to provide a device for making what is known as "an as found test", meaning a test on the premises where the watthour meter is installed for the purpose of ascertaining whether or not the meter is in calibration, and if found not to be in calibration, for ascertaining the per cent error or amount of inaccuracy of the watthour meter.

To these and other ends hereinafter set forth or appearing the invention may be said to include a device for testing watthour meters comprising an indicating instrument of the watt meter type adapted for inclusion in the watthour meter circuit, a constant speed shutter provided with spaced openings through which markings provided on a moving part of the watthour meter are visible presenting a standing image of the markings when the speed thereof and of the openings in the shutter coincide and indicating that the watthour meter is in calibration and presenting a drifting image backward or forward of the markings when the speed thereof and of the openings in the shutter do not coincide indicating an inaccuracy or error in the watthour meter with standard watt indication on said instrument, an adjustable loading device adapted for inclusion in the watthour meter circuit and arranged for loading the watthour meter to standard watt indication on the instrument and for loading an inaccurate or erroneous watthour meter above and below standard watt indication to bring the speed of the markings into coincidence with the speed of the openings and to present a standing image, whereby the amount of the error or inaccuracy of the watthour meter is shown on the indicating instrument by the amount of departure from standard watts indication.

The invention further comprises the improvements to be presently described and finally claimed.

In the following description reference will be made to the accompanying drawing forming part hereof and in which Figure 1 is an elevational view partly in section and partly diagrammatic.

Figure 1:
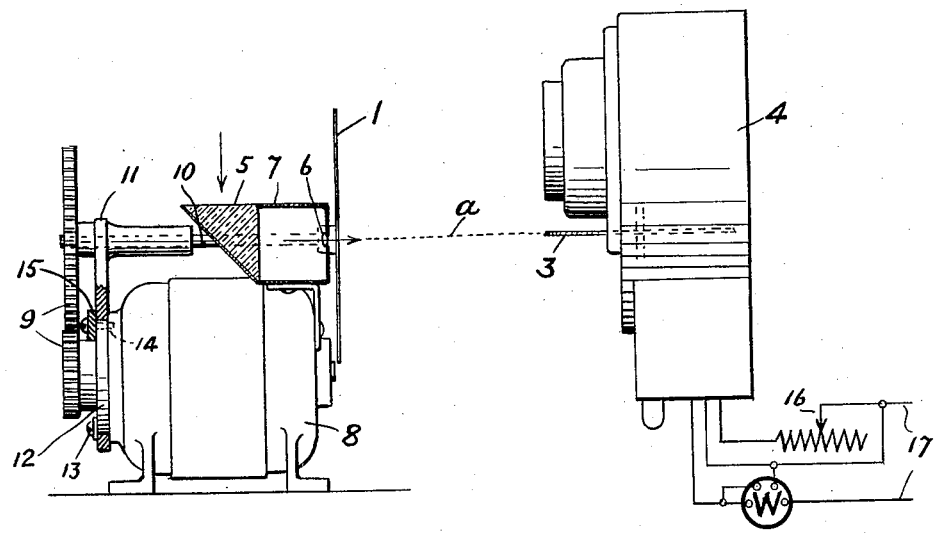
Figure 2:
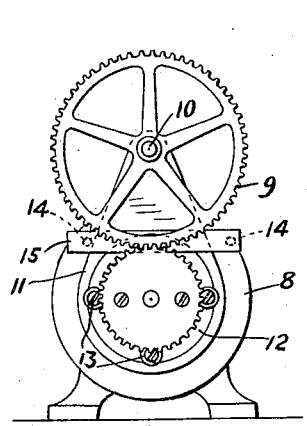
Fig. 2 is an end view looking toward the right in Fig. 1.
Figure 3:
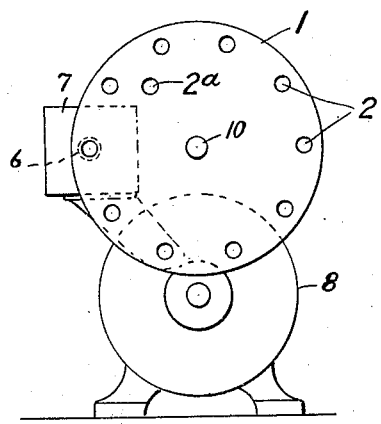
Fig. 3 is an end view looking from the center of Fig. 1 toward the left.

Referring to the drawing, 1 is a constant speed shutter provided with spaced openings 2 through which markings provided on a moving part or disk 3 of the watthour meter 4 are visible. As shown there is an optical system arranged in such manner as to improve the vision. The optical system is shown to comprise a prism 5, a lens 6, and a housing 7. The optical system is mounted in proper relation to the moving opening or openings in the shutter for interrupting vision at the proper time. In Fig. 1 the dotted line $a$ may be said to indicate the line or field of vision and in a general way it shows the relation of the two structures shown in that figure. The synchronous motor 8 with the gear wheels 9 is a means for turning the shaft 10 on which the shutter 1 is mounted at constant speed. At this point it may be said that it is frequently desirable to test a watthour meter under full load capacity and also under a comparatively light load. In order to do this the shutter may be provided with an opening or openings $2^a$ arranged at a different distance from its center than the openings 2, and the opening or openings $2^a$ are spaced differently from the openings 2. In order to bring the openings 2 or $2^a$ into the line of vision the shutter 1 is shown as mounted upon an arm 11 turnable on a circular hub 12 provided on the motor frame, and by provision of the clamping screws 13 adapted to be turned on the hub so that either set of holes 2 or 2ª can be brought into the line of vision or, otherwise stated, opposite the lens 6. 14 are stops mounted on a bar 15 secured to the motor frame and when present they serve to limit the amount of adjustment of the arm 11. In conjunction with the apparatus above described there is an indicating instrument W of the wattmeter type and an adjustable load device 16 included in the watthour meter circuit 17. The indicating instrument W and the loading device 16 are provisions of the testing device forming the subject matter of this application for a patent. The current elements of the meters are connected in series with the load 16 and the voltage elements are connected in parallel across the line whereby the load is simultaneously measured by both meters.

The mode of operation may be described as follows:

A load is placed on the watthour meter, for example, by the loading device 16, such that the indicating instrument W indicates standard watts, that is watts representing full capacity load on the watthour meter or representing a small portion of full capacity load in cases where the watthour meter is to be tested at both loads. The disk 3 rotates and the markings on it move. The motor 8 drives the shutter 1 at constant speed. The observer, in the device illustrated, looking down on the prism 5, sees the image of the markings. If the speed of the markings and the speed of the openings coincide, there is presented a standing image of the markings, indicating that the wattmeter is in calibration and by calibration is meant that the watthour meter is correct. However, if the speed of the openings in the shutter and the speed of the markings on the disk 3 do not coincide there is presented a drifting image backward or forward of the markings indicating an inaccuracy or error in the watthour meter. The observer now adjusts the loading device 16 until there is presented a standing image of the markings and the observer then notes the departure, one way or the other, of the reading on the indicating instrument W from standard watts and thus the per cent error or amount of inaccuracy of the watthour meter is shown on the indicating instrument.

If the test is made at full load capacity the set of openings 2 in the shutter are employed, and if the test is made at less than full load capacity, use is made of the set of openings 2ª.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. A device for testing watthour meters comprising, in combination, an indicating instrument of the watt meter type adapted for inclusion in the watthour meter circuit, a constant speed shutter provided with spaced openings through which markings provided on a moving part of the watthour meter are visible presenting a standing image of the markings when the speed thereof and of the openings in the shutter coincide and indicating that the watthour meter is in calibration and presenting a drifting image backward or forward of the markings when the speed thereof and of the openings in the shutter do not coincide indicating an inaccuracy or error in the watthour meter with standard watt indication on said instrument, an adjustable loading device adapted for inclusion in the watthour meter circuit and arranged for loading the watthour meter to standard watt indication on the instrument and for loading an inaccurate or erroneous watthour meter above and below standard watt indication to bring the speed of the markings into coincidence with the speed of the openings and to present a standing image, whereby the amount of the error or inaccuracy of the watthour meter is shown on the indicating instrument by the amount of departure from standard watt indication.

2. A device for testing watthour meters comprising, in combination, a watt meter adapted for inclusion in the watthour meter circuit, a shutter provided with sets of spaced openings through which markings provided on the watthour meter disc are visible, adjustable means on which said shutter is mounted and which are adapted to present either set of openings opposite said disc, means for moving said shutter at constant speed, and an adjustable loading device adapted for inclusion in the watthour meter circuit.

3. In a stroboscopic testing device for watthour meters, the combination with a meter to be tested having a rotatable disc and a plurality of equally spaced marks on the periphery of said disc, of a rotatable shutter mounted on an axis angularly related to the axis of said meter disc and having a plurality of openings disposed circumferentially thereof, means for rotating said shutter at a constant speed, said shutter and disc being so related that a line of sight through one of said openings intercepts a portion of the periphery of said disc.

4. In a device for stroboscopically testing a watthour meter at various load conditions, the combination with a meter to be tested, including a rotatable disc having a plurality of equally spaced marks on the periphery thereof, and means for varying the load on said meter, of an optical system for viewing said marks, a rotatable shutter disposed between said optical system and said rotatable meter disc, means for rotating said shutter at a constant speed, a plurality of sets of openings in said shutter spaced radially thereof, and means for adjusting the relative position of said shutter with respect to said optical system to bring a desired set of openings into the line of sight from said optical system to said meter disc.

5. The method of testing a watthour meter having a rotatable disc marked with equispaced indicia on the peripheral edge thereof, which comprises applying a predetermined load to said meter, stroboscopically viewing said disc through a shutter rotated at a constant speed, varying the load on the meter to adjust the speed of said meter disc to coincide with the speed of said shutter, and observing the percentage of error in the speed of said rotatable disc by measuring the watts flowing through the meter being tested and comparing the value of said watts with the value of watts which would flow through a standard meter, rotated in synchronism with said shutter.

6. The method of testing a watthour meter which comprises the steps of loading the meter, varying the load until its rotatable element rotates at a predetermined speed identical to that at which the rotatable element of a standard meter would rotate under a predetermined load, measuring the load applied, and comparing it to said predetermined load.

7. In a device for stroboscopically testing watthour meters, an optical system through which a rotatable element of a watthour meter may be observed, a rotatable shutter disposed for intercepting the line of vision, a plurality of radially disposed sets of circumferentially spaced openings in said shutter, means for pivotally supporting said rotatable shutter whereby its position may be adjusted relatively to said optical system to bring the desired set of openings into the line of sight of said optical system, and means for rotating said shutter at a constant predetermined speed.

FREDERICK STRATTNER.
WALTER C. WAGNER.